(12) United States Patent
Watanabe et al.

(10) Patent No.: US 7,843,638 B2
(45) Date of Patent: Nov. 30, 2010

(54) OPTICAL SYSTEM FOR LIGHT FLUX TRANSFER, AND RETINAL SCANNING DISPLAY USING SUCH AN OPTICAL SYSTEM

(75) Inventors: Mitsuyoshi Watanabe, Hashima (JP); Hidenori Oka, Toukai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 12/382,473

(22) Filed: Mar. 17, 2009

(65) Prior Publication Data

US 2009/0190094 A1    Jul. 30, 2009

Related U.S. Application Data

(63) Continuation-in-part of application No. PCT/JP2007/068366, filed on Sep. 21, 2007.

(30) Foreign Application Priority Data

Sep. 28, 2006    (JP)    .............................. 2006-265134

(51) Int. Cl.
G02B 5/18    (2006.01)
G02B 5/32    (2006.01)
G02B 27/14   (2006.01)

(52) U.S. Cl. .................. 359/566; 359/15; 359/573; 359/630

(58) Field of Classification Search ............. 359/211.1, 359/558, 566, 572, 573, 15, 630; 385/31
See application file for complete search history.

(56) References Cited

U.S. PATENT DOCUMENTS

| 6,710,902 | B2 | 3/2004 | Takeyama |
| 7,085,027 | B2 | 8/2006 | Ouchi et al. |
| 7,418,170 | B2* | 8/2008 | Mukawa et al. ............... 385/31 |
| 7,502,168 | B2* | 3/2009 | Akutsu et al. ............... 359/573 |
| 2006/0228073 | A1 | 10/2006 | Mukawa et al. |
| 2007/0171370 | A1 | 7/2007 | Watanabe |

FOREIGN PATENT DOCUMENTS

| JP | A-2002-162598 | 6/2002 |
| JP | A-2002-311379 | 10/2002 |
| JP | A-2003-140081 | 5/2003 |
| JP | A-2006-098570 | 4/2006 |
| JP | A-2006-251126 | 9/2006 |
| WO | WO 2004/097498 A1 | 11/2004 |
| WO | WO 2005/093493 A1 | 10/2005 |

* cited by examiner

*Primary Examiner*—Jack Dinh
(74) *Attorney, Agent, or Firm*—Oliff & Berridge, PLC (57) ABSTRACT

The present invention provides an optical system that can reduce the occurrence of aberration, and a scanning retinal display that uses such an optical system. A first diffraction section and the second diffraction section are attached to a light guiding section in a state separated from each other. The first diffraction section diffracts light flux that is incident on it, to be incident on the light guiding section. The light guiding section guides light flux that has been diffracted by the first diffraction section to the second diffraction section using reflection inside the light guiding section. The second diffraction section re-diffracts light flux that has been guided by the light guiding section and output externally of the light guiding section. The first diffraction section, the light guiding section, and the second diffraction section are substantially symmetrical, either side of a virtual plane between the first diffraction section and the second diffraction section.

10 Claims, 8 Drawing Sheets

OPTICAL SYSTEM FOR LIGHT FLUX TRANSFER, AND RETINAL SCANNING DISPLAY USING SUCH AN OPTICAL SYSTEM

BACKGROUND OF THE INVENTION

1. Technical Field

The present invention relates to an optical system for light flux transfer, and to a scanning retinal display using such an optical system.

2. Description of the Related Art

An optical system for guiding an image that has been formed on an image display element to the eyes using a diffraction optical system has been proposed, as disclosed in the patent publications.

1) Japanese Unexamined Patent Publication No. 2002-311379
2) Japanese Unexamined Patent Publication No. 2003-140081
3) International Patent publication No. WO2004/097498

With this type of optical system, an image is formed at a position that is distance from the eyes, and the formed image can be transferred to the eyes. Accordingly, if this optical system is used it is possible to have an image forming device distant from the eyes. This is effective when, for example, implementing a head mounted display.

However, with the optical system of the related art there is a problem that the transferred image is degraded due to aberrations caused by diffraction at the time of image transfer, particularly chromatic aberration.

SUMMARY OF THE INVENTION

The present invention has been conceived in view of the above-described situation. An object of the present invention is to provide an optical system that can reduce the occurrence of aberration, and a scanning retinal display that uses such an optical system.

The optical system of the present invention comprises a first diffraction section, a second diffraction section, and a light guiding section. The first diffraction section and the second diffraction section are attached to the light guiding section in a state separated from each other. The first diffraction section diffracts light flux that is incident on this first diffraction section, to be incident on the light guiding section. The light guiding section guides light flux that has been diffracted by the first diffraction section to the second diffraction section using reflection or refraction inside the light guiding section. The second diffraction section re-diffracts light flux that has been guided by the light guiding section and output to the outside of the light guiding section. The first diffraction section, the light guiding section, and the second diffraction section are substantially symmetrical, either side of a virtual plane between the first diffraction section and the second diffraction section.

In the present invention, the symmetry is, for example, line symmetry either side of the virtual plane.

The first diffraction section of the present invention can also be configured to have an intermediate image plane formed on a surface of the light guiding section using light flux that has been diffracted by this first diffraction section.

The optical system of the present invention can be further provided with a protective member. Here, the first diffraction section is configured to have an intermediate image plane formed on a surface of the light guiding section using light flux that has been diffracted by this first diffraction section. Also, the protective member is arranged at a position where the intermediate image is formed so as to cover the surface of the light guiding section.

The optical system of the present invention can be further provided with a pupil magnification diffraction section. Here, the first diffraction section is configured to have an intermediate image plane formed on a surface of the light guiding section using light flux that has been diffracted by this first diffraction section. Also, the pupil magnification diffraction section is arranged on a surface of the light guiding section at a position where the intermediate image plane is formed, and is constructed to expand an exit pupil constituted by light flux that has been diffracted by this pupil magnification diffraction section.

The first diffraction section of the present invention can also be configured have an intermediate image plane formed inside or on a surface of the light guiding section using light flux that has been diffracted by this first diffraction section. Further, light flux that has been diffracted by the first diffraction section can be reflected at least once inside the light guiding section, until reaching the intermediate image plane.

The first diffraction section can also be configured to have an intermediate image plane formed inside or on a surface of the light guiding section using light flux that has been diffracted by this first diffraction section. Further, light flux that has been diffracted by the first diffraction section can be reflected at least three times inside the light guiding section, until reaching the intermediate image plane.

The first diffraction section can also be configured to have an intermediate image plane formed inside the light guiding section using light flux that has been diffracted by this first diffraction section. It is also possible for the virtual plane to be at substantially the same position as the intermediate image plane. In this example, symmetry means rotational symmetry either side of the virtual plane.

The light guiding section can be formed substantially plate-shaped. At this time, it is possible to have the first diffraction section arranged at one side of the light guiding section, and the second diffraction section arranged at the other side of the light guiding section.

The retinal scanning display of the present invention is provided with an optical system having any of the forms of the present invention, and an image forming device. The image forming device is configured to irradiate light flux to the first diffraction section of the optical system, and scan the light flux on the first diffraction section. The second diffraction section is configured to output the light flux that has been scanned as described above and has passed through the light guiding section in the direction of the user's retina. This display is configured so as to form an image on the retina using light flux that has been output towards the retina.

According to the present invention it is possible to provide an optical system that can reduce the occurrence of aberration, and a scanning retinal display that uses such an optical system.

DESCRIPTION OF THE PREFERRED EMBODIMENTS

Structure of a First Embodiment

A retinal scanning display that uses the optical system of the first embodiment of the present invention will be described based on FIG. 1 to FIG. 4.

Figure 1:
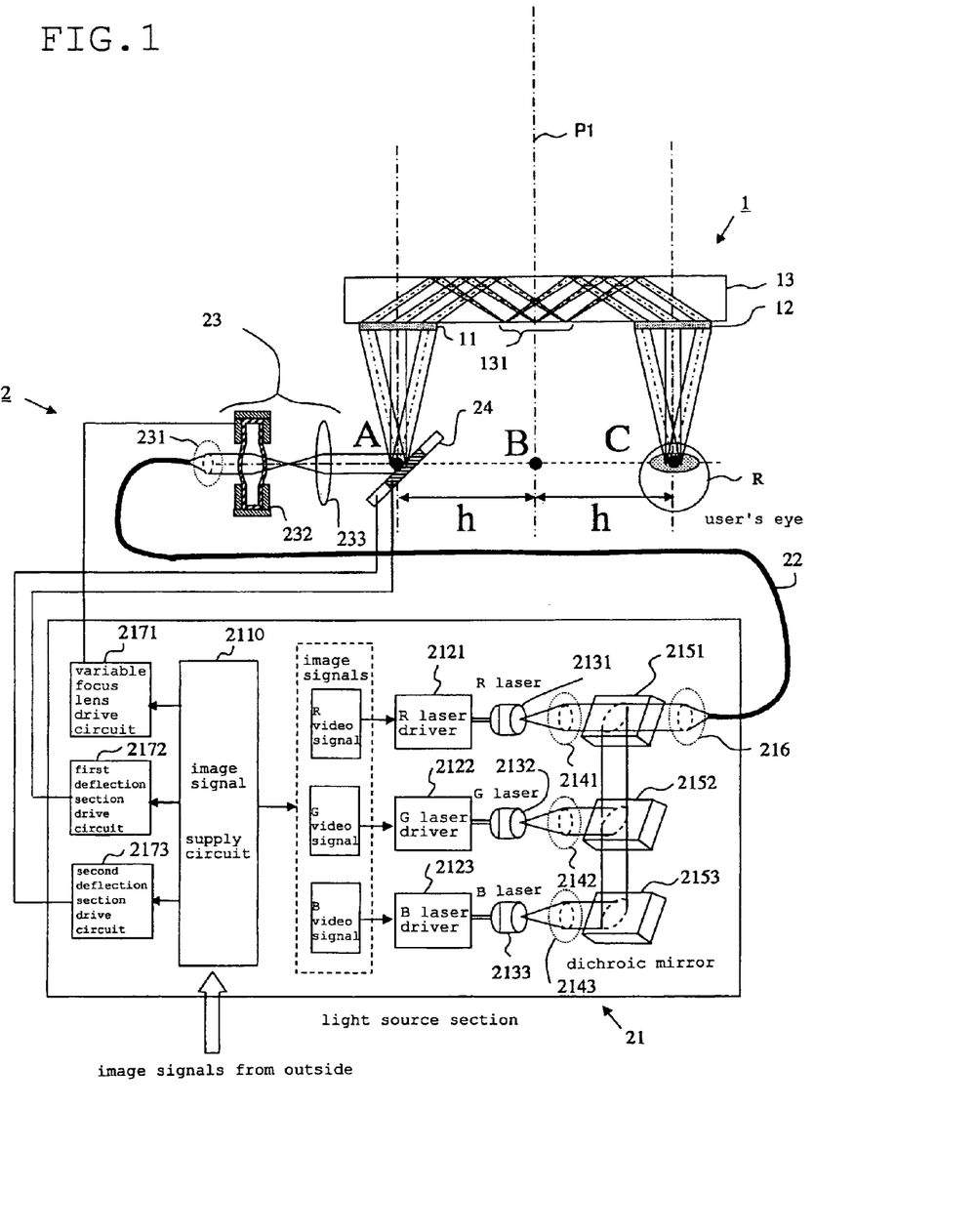
FIG. 1 is an overall schematic diagram of a retinal scanning display of a first embodiment of the present invention.

This retinal scanning display is provided with an optical system 1 and an image forming section 2 as main components.

The optical system 1 comprises a first diffraction section 11, a second diffraction section 12, and a light guiding section 13. The first diffraction section 11 and the second diffraction section 12 are attached to the light guiding section 13 in a state separated from each other. Centers of the first diffraction section 11 and the second diffraction section 12 are both a distance h from a center of the light guiding sections.

The first diffraction section 11 diffracts light flux that is incident on this first diffraction section 11 to be incident on the light guiding section 13. As this type of first diffraction section 11, there is, for example, a transmission type diffraction grating called a hologram optical element (HOE). A primary diffraction angle of the first diffraction section of this embodiment is made 50°. Also, the thickness of this first diffraction section is made 5 mm. Of course, these numerical values are only one example.

The light guiding section 13 guides light flux that has been diffracted by the first diffraction section 11 to the second diffraction section 12 using reflection inside the light guiding section 13. This type of light guiding section 13 is provided with a basic function as a waveguide for light. The light guiding section of this embodiment is formed in a plate shape as shown in FIG. 1. Also, the material of the light guiding section is preferably transparent to light in the wavelength range to be used, and it is possible to use, for example, PMMA or quartz glass etc.

The second diffraction section 12 re-diffracts light flux that has been guided by the light guiding section 13 and output externally of the light guiding section 13. The second diffraction section 12 has basically the same structure as the first diffraction section 11.

Also, the second diffraction section 12 is configured to output light flux that has been scanned using the image forming device 2 (described later), and has passed through the light guiding section 13 towards a retina of an eyeball R of a user (refer to FIG. 1).

The first diffraction section 11, the light guiding section 13, and the second diffraction section 12 are substantially symmetrical, either side of a virtual plane P1 between the first diffraction section 11 and the second diffraction section 12. Here, the virtual plane P1 is arranged midway between the first diffraction section 11 and the second diffraction section 12. Specifically, the virtual plane P1 passes through the midpoint B between points A and C in FIG. 1. Here, a line segment AC corresponds to a distance between respective centers of the diffraction section 11 and the second diffraction section 12. Also, symmetry in this embodiment means line symmetry either side of the virtual plane P1.

Here, the meaning of "substantially symmetrical" will be further explained in the following. Substantially symmetry has the meaning of "attributes, from an optical viewpoint, of elements contributing to propagation of light that is incident on the first diffraction section 11 and is output from the second diffraction section 12 are symmetrical". Generally, the first diffraction section 11 and the second diffraction section 12 are of the same material, and if the light guiding section 13 is given a homogenous characteristic it is possible to obtain this type of symmetry with a comparatively simple structure.

The image forming device 2 is configured to irradiate light flux to the first diffraction section 11 of the optical system 1, and form an image on the first diffraction section 11 by scanning light flux. In more detail, the image forming device 2 of this embodiment is provided with a light source section 21, an optical fiber 22, a focus adjustment section 23 and a light deflection section 24. The image forming device 2 itself of this embodiment can be one that is conventionally known (refer, for example, to unexamined Japanese patent publication No. 2006-98570, or U.S. Pat. No. 5,701,132), and so only a brief description is given in the following.

The light source section 21 comprises a video signal supply circuit 2110, laser drivers 2121 to 2123 for each of the colors RGB, lasers 2131 to 2133 for each of the colors RGB, collimator optical systems 2141 to 2143 and dichroic mirrors 2151 to 2153 for respective lasers, a merging optical system 216 for merging each of the laser lights, a variable focus lens drive circuit 2171 for driving focus adjustment means (variable focus lens 232, that will be described later), and first and second deflection section drive circuits 2172 and 2173 for driving a light deflection section 24 (described later) in a main scanning direction or a subsidiary scanning direction.

The optical fiber 22 is for propagating light flux that has been generated by the light source section 21 to the focus adjustment section 23. Naturally, instead of the optical fiber it is possible to use another type of waveguide, and it is also possible to propagate light by causing propagation of free space.

The focus adjustment section 23 is provided with a collimator optical system 231, a variable focus lens 232 and a collimator lens 233.

Figure 2:
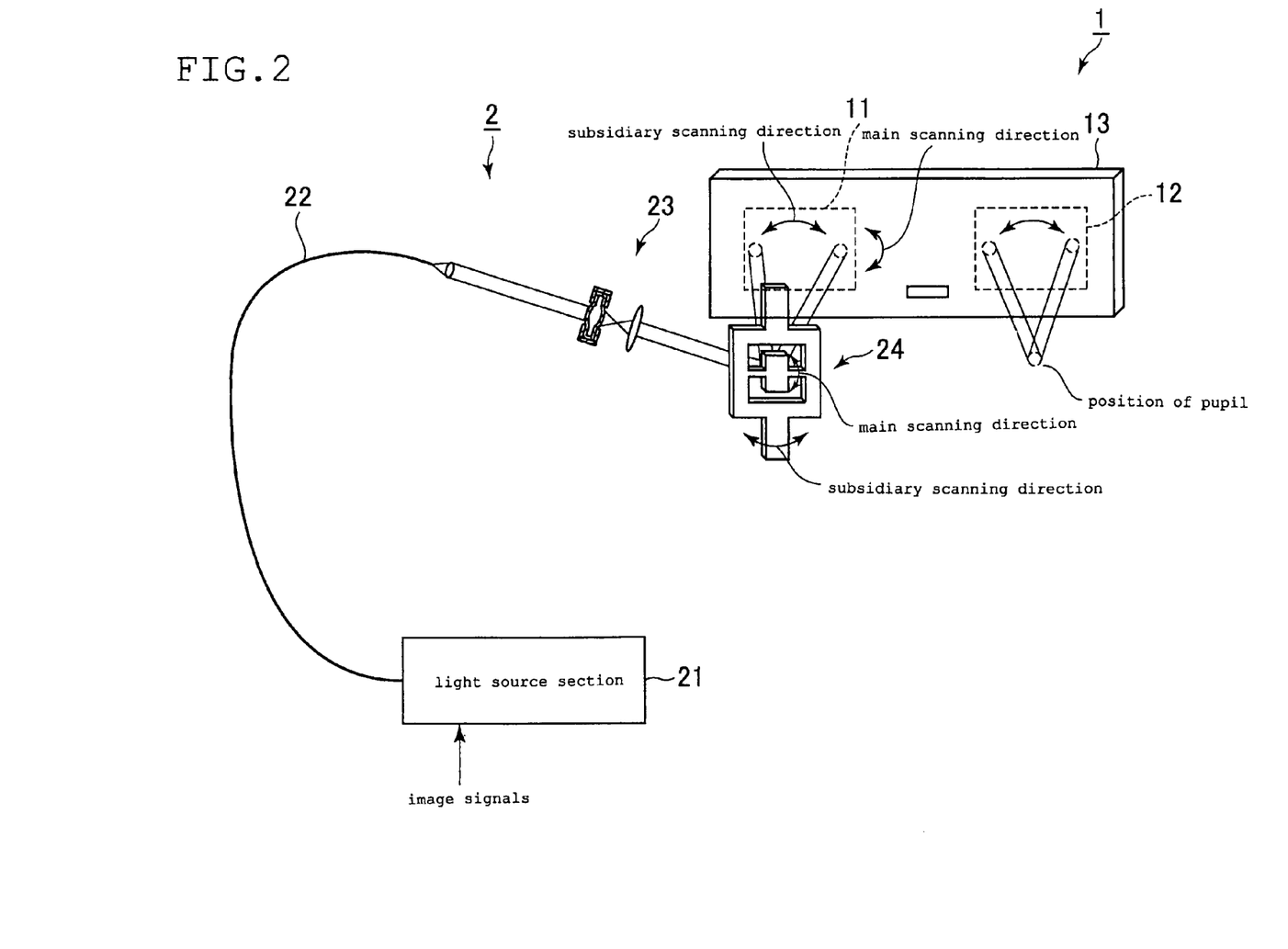
FIG. 2 is an explanatory drawing for describing scanning using a light deflecting section, in the first embodiment.
Figure 3:
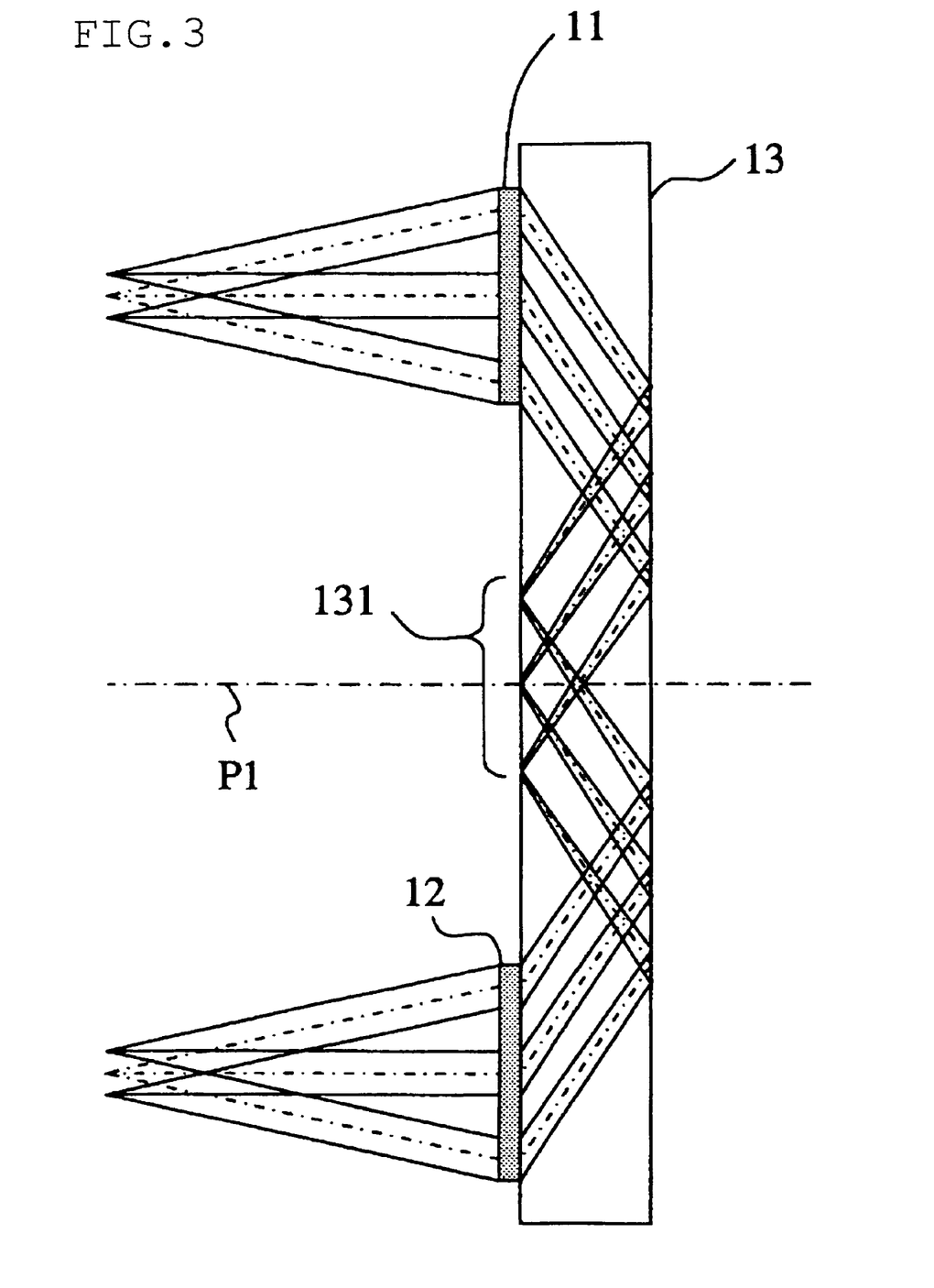
FIG. 3 is an enlarged drawing of the optical system shown in FIG. 1.

The light deflecting section 24 is capable of rotation in a specified angular range in a forward and reverse direction, for a main scanning direction (vertical direction in FIG. 2) and a subsidiary scanning direction (horizontal direction in FIG. 2). Also, the light deflecting section 24 is configured so that it is possible to scan light flux in a main scanning direction and a subsidiary scanning direction by reflecting light flux that has passed through the collimator lens 233. More specifically, there has been proposed, in the light deflection section 24, a MEMS scanner fitted with drive mechanisms (not shown) such as electrostatic actuators for driving the light deflection section 24 independently in the main scanning direction and the subsidiary scanning direction. Control of operation of the drive mechanism is then carried out by first and second drive circuits 2172 and 2173 that are connected to the drive mechanism. Naturally the mechanism for driving the light deflection section 24 is not limited to the electrostatic actuator, and it is possible to use various mechanisms. For example, it is possible to control operation of the light deflection section 24 using deformation of a piezoelectric element that is driven by voltage.

Operation of the First Embodiment

Next, operation of the device of the first embodiment configured as described above will be described.

If video signals are input from outside to the video signal supply circuit 2110, the video signal supply circuit 2110 generates video signals for each of the colors RGB, and transmits these signals to the laser drivers 2121 to 2123 of each color. Each of the laser drivers 2121 to 2123 drives the lasers 2131 to 2133 for each color to emit light in accordance with each video signal. Laser light from these lasers 2131 to 2133 is made into parallel beams by collimator optical systems (collimator lenses) 2141 to 2143, and after that reflected by the dichroic mirrors 2151 to 2153 and converged into a single beam. In more detail, the dichroic mirrors 2152 and 2153 reflect respective laser light, and send to the dichroic mirror 2151. The dichroic mirror 2151 passes the light from the R laser 2131, and reflects light in a band other than this. In this way, it is possible to superimpose (namely converge) light from each laser.

Converged laser light is merged by the merging optical system 216, and made incident on the optical fiber 22. Laser light that has propagated inside the optical fiber 22 is made into a parallel beam by the collimator optical system 231 arranged at the exit side of the optical fiber 22, and subjected to focus adjustment by the variable focus lens 232.

Here, the variable focus lens 232 carries out focus adjustment using a drive circuit 2171. In more detail, it is possible to carry out focus adjustment by driving a focus adjustment mechanism (not shown) of the variable focus lens 232 in response to drive signals from the drive circuit 2171. It is possible to use, for example, a micropump for adjusting internal pressure of the variable focus lens 232 as the focus adjustment mechanism of the variable focus lens. It is also possible, of course, to use another mechanism.

Laser light that has been focused by the variable focus lens 232 is made into a parallel beam by the collimator lens 233 and made incident on the light deflecting section 24. The above described operation is basically the same as for a conventional retinal scanning display, and so a more detailed description will be omitted.

The light deflecting section 24 is respectively driven in the main scanning direction and the subsidiary scanning direction by drive circuits 2172 and 2173. In this way, the light deflecting section 24 can irradiate laser light towards the surface of the first diffraction section 11 while scanning laser light two-dimensionally in the main scanning direction and subsidiary scanning direction. Operation of the light deflecting section 24 is also basically the same as for a conventional retinal scanning display, and so a more detailed description will be omitted.

The first diffraction section 11 diffracts laser light (specifically light flux) that has been irradiated to its surface. The diffracted light flux then passes through the inside of the light guiding section 13 while being reflected at the surfaces of the light guiding section 13. Here, the order of the diffracted light advancing through the inside of the light guiding section is refracted is appropriately set taking into consideration the required light strength and diffraction angle. For example, first order diffracted light is preferable used in order to improve light strength, and second or higher order diffracted light is preferable used in order to increase diffraction angle (angle formed by diffracted light and a line normal to the diffraction grating surface).

With this embodiment, light flux passing through the inside of the light guiding section 13, forms an intermediate image plane midway during propagation. Specifically, the intermediate image plane is formed in a region 131 (refer to FIG. 1 and FIG. 3) of the light guiding section 131. Here, with this embodiment, light flux that has been diffracted by the first diffraction section 11 is reflected once inside the light guiding section 13, until reaching the intermediate image plane.

After that, the light flux advances further inside the light guiding section 13 and reaches the second diffraction section 12. Light flux that has reached the second diffraction section 12 is diffracted again by the second light diffracting section 12, and exits towards the eyeball R (more specifically the retina) of the user (observer).

The exiting light flux is scanned in accordance with scanning by the light deflection section 24, and as a result it is possible to form an image on the surface of the retina of the user. Specifically, it is possible to present an image to the user.

With the device of this embodiment, the first diffraction section 11, the light guiding section 13, and the second diffraction section 12 are substantially symmetrical, either side of a virtual plane between the first diffraction section 11 and the second diffraction section 12. Therefore, various aberrations (for example, distortion) occurring in the first diffraction section 11 are cancelled by diffraction in the second diffraction section arrange symmetrically with it. In this way, according to the device of this embodiment, it is possible to reduce aberration arising due to diffraction, and there is the advantage that it is possible to improve quality of an image presented to the user.

APPLIED EXAMPLE

Figure 4:
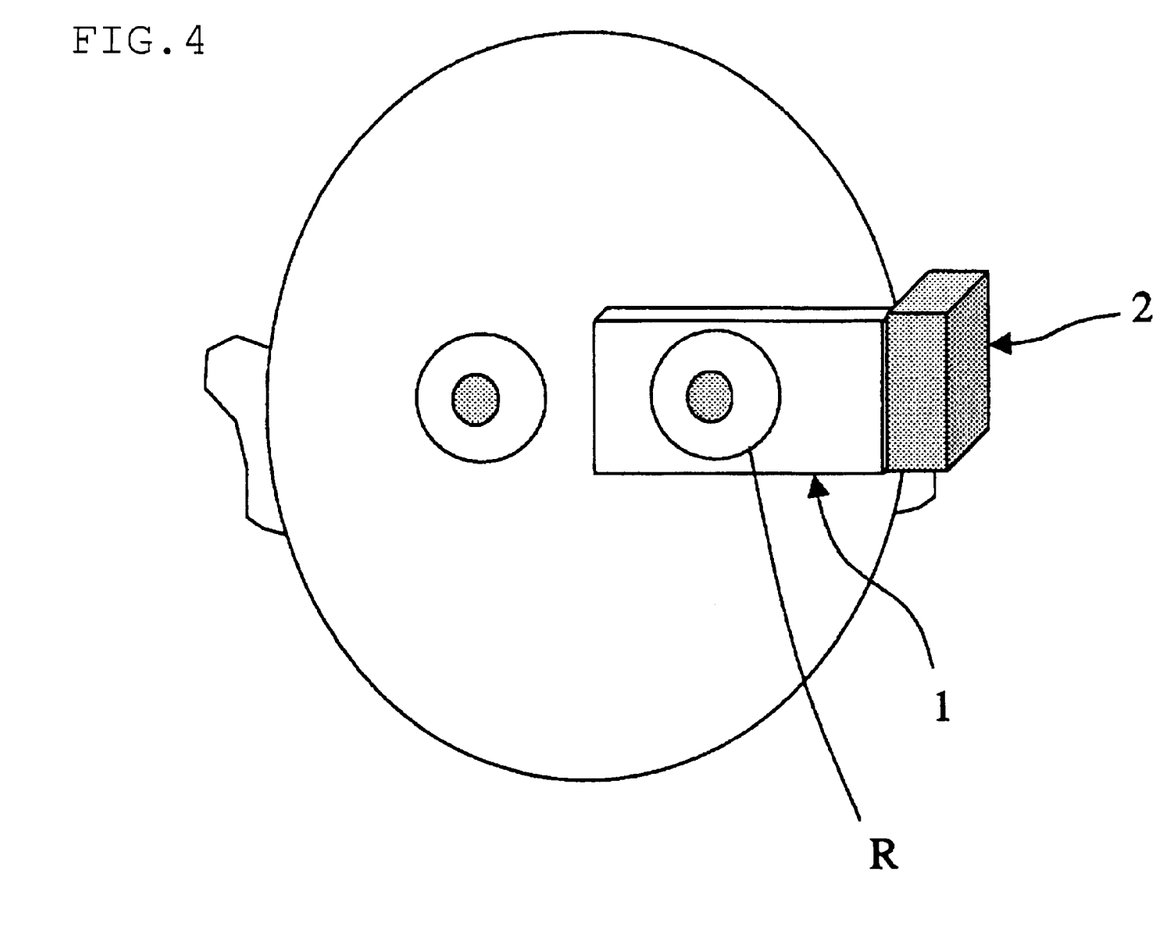
FIG. 4 is an explanatory drawing showing an example where the retinal scanning display shown in FIG. 1 has been fitted to a user's head.

One example of fitting the device of this embodiment to the head of a user is shown in FIG. 4. With this example, the image forming device 2 is attached to the side of the head of a user, and optical system 1 is arranged in front of the user's face. At this time, the second diffraction section 12 is arranged in front of one eyeball R of the user. In doing this, it is made possible to present a specified image to the user while keeping down constraint of the users field of view.

Second Embodiment

Next, an optical system 201 of a second embodiment of the present invention will be described based on FIG. 5. In the description of this embodiment, structural elements that are basically common to the optical system 1 of the first embodiment use the same reference numerals to simplify the following description.

With the optical system 1 of the first embodiment described above, a transmission type diffraction grating was used as the first diffraction section 11 and the second diffraction section 12. In contrast, in the optical system of the second embodiment a reflection type diffraction grating is used as the first diffraction section 211 and the second diffraction section 212. With this example, the first diffraction section 211 and the second diffraction section 212 are both arranged on the surface of the light guiding section 13, at a side opposite to the eyeball position of the user.

With the second embodiment also, the first diffraction section 211 and the second diffraction section 212 use diffraction gratings of the same structure.

In the second embodiment also, the optical system constituted by the first diffraction section 211, the light guiding section 13 and the second diffraction grating 212 is symmetrical either side of a virtual plane P2 (refer to FIG. 5) between the first diffraction section 211 and the second diffraction section 212.

With the second embodiment, light flux that has been sent from the image forming device 2 passes once through the light guiding section 13, and after that reaches the first diffraction section 211. Light flux that has reached the first diffraction section 211 is reflected and diffracted by the first diffraction section 211, and propagates through the inside of the light guiding section 13.

Figure 5:
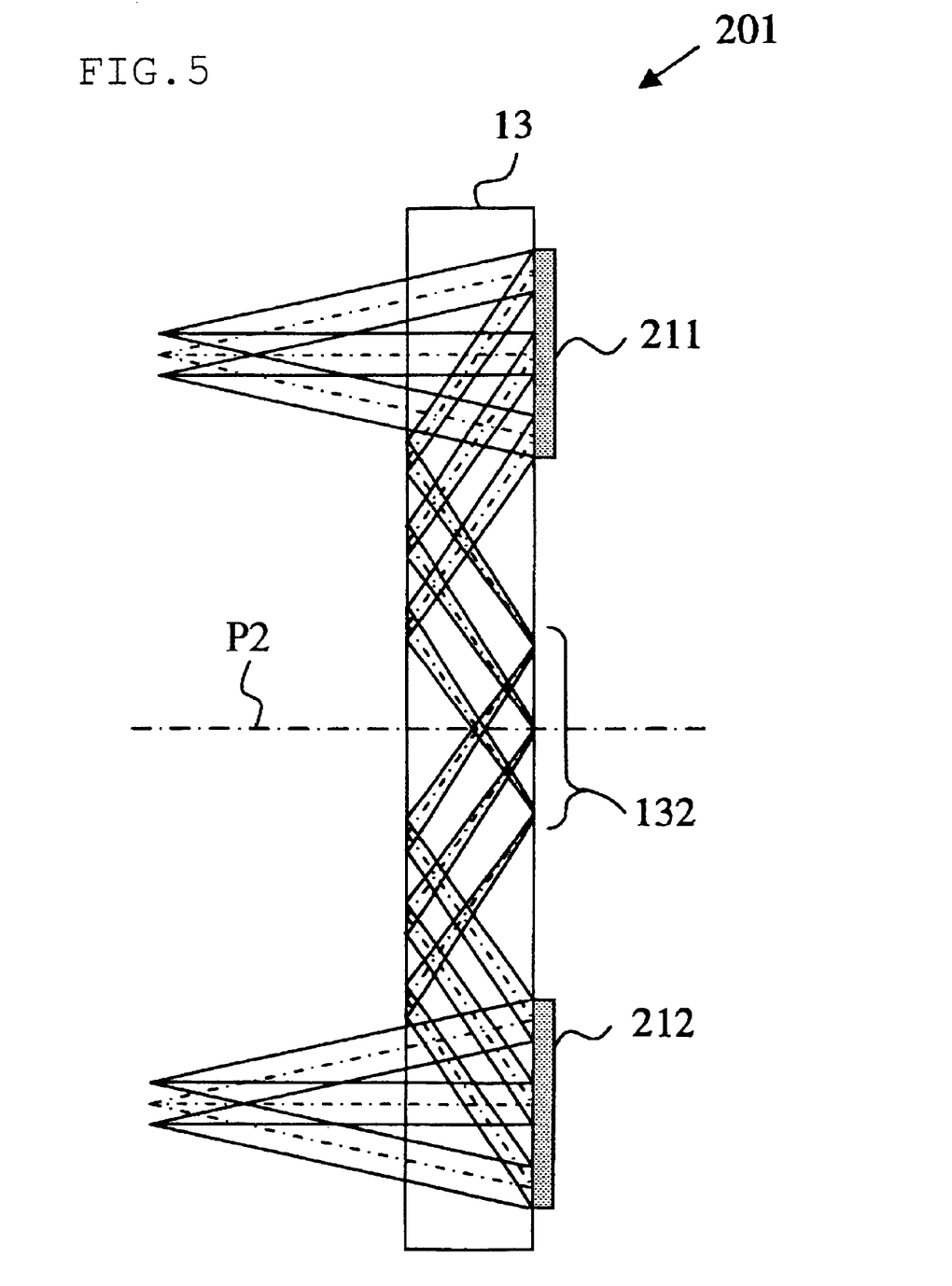
FIG. 5 is an explanatory drawing showing an optical system of a second embodiment of the present invention.

Here, with the second embodiment an intermediate image plane is formed at a region 132 on the surface of the light guiding section 13 (refer to FIG. 5).

After that, light flux that has reached the second diffraction section 212 is reflected and diffracted again by the second light diffracting section 212, and exits towards the retina of the user.

With the device of the second embodiment also, it is possible to cancel aberrations arising with diffraction of the first diffraction section 211 with diffraction of the second diffraction section 212, and it is possible to improve quality of an image presented to the user.

The structure and advantages of the device of the second embodiment are basically the same as the first embodiment, and so a more detailed description will be omitted.

Third Embodiment

Figure 6:
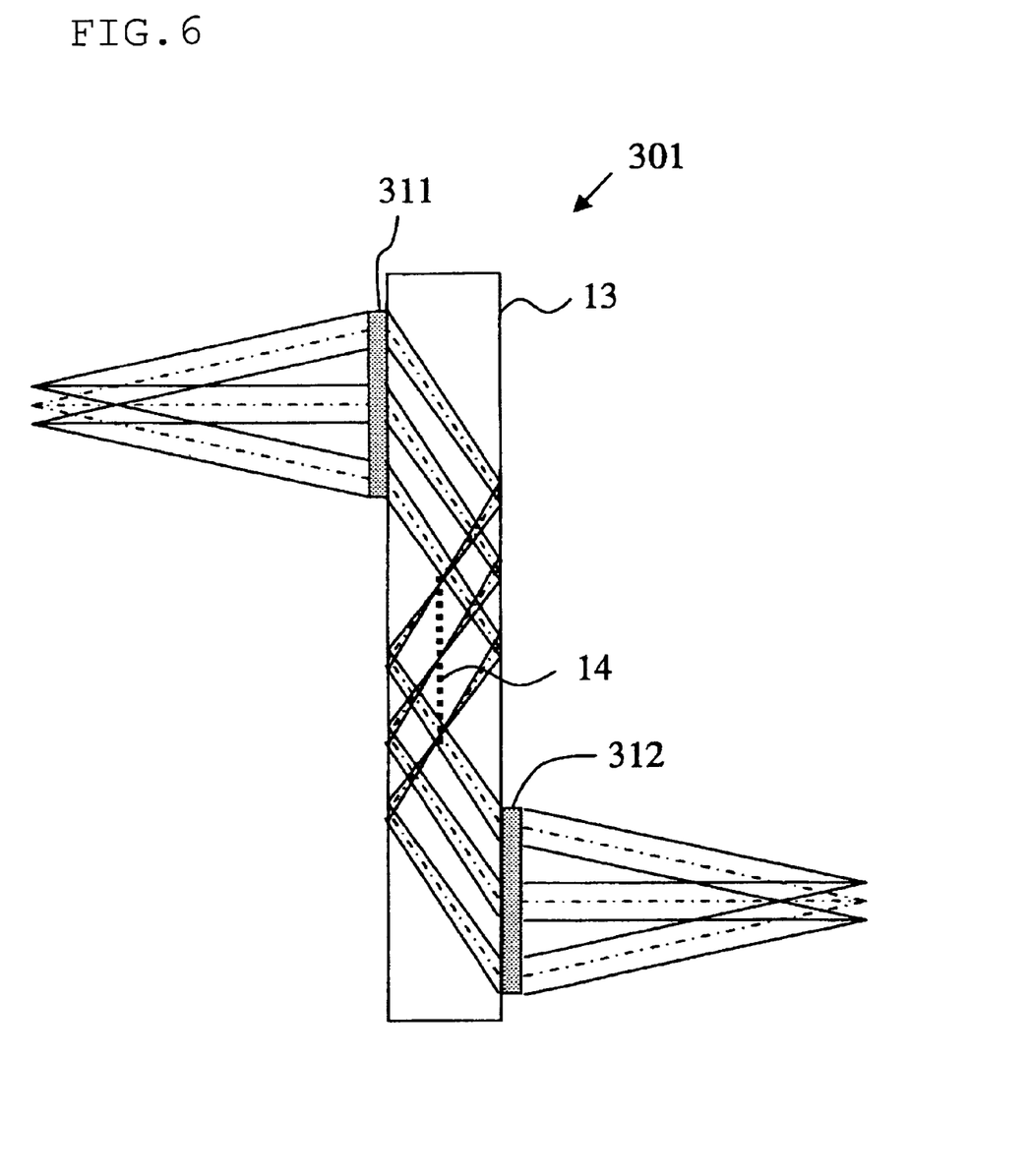
FIG. 6 is an explanatory drawing showing an optical system of a third embodiment of the present invention.

Next, an optical system 301 of a third embodiment of the present invention will be described based on FIG. 6. In the description of this embodiment, structural elements that are basically common to the optical system 1 of the first embodiment use the same reference numerals to simplify the following description.

With the optical system 1 of the first embodiment described above, the first diffraction section 11 and the second diffraction section 12 were arranged on the same surface of the light guiding section 13. Conversely, in the optical system of the third embodiment, the first diffraction section 311 is arranged on one surface of the light guiding section 13, while the second diffraction section 312 is arranged on the other surface (opposite surface) of the light guiding section 13.

With the third embodiment also, the first diffraction section 311 and the second diffraction section 312 use diffraction gratings of the same structure.

With the third embodiment, light flux that has exited from the image forming device 2 is diffracted by the first diffraction section 311. The diffracted light flux propagates through the inside of the light guiding section 13, and after being reflected once forms an intermediate image plane 14 midway during that propagation.

Specifically, the first diffraction section 311 is configured to have an intermediate image plane 14 formed inside the light guiding section 13 using light flux that has been diffracted by this first diffraction section 311.

Also, in the third embodiment, the first diffraction section 311, light guiding section 13 and second diffraction section 312 are substantially rotationally symmetrical either side of the intermediate image plane 14. Therefore, with this embodiment, if it is assumed that a virtual image plane 14 is at substantially the same position as the intermediate image plane, the optical system is rotationally symmetrical either side of this virtual plane.

With the third embodiment, light flux that has been reflected twice by the light guiding section 13 reaches the second diffraction section 312, is diffracted again by the second light diffracting section 312, and exits towards the retina of the user.

With the device of the third embodiment also, it is possible to cancel aberrations arising with diffraction of the first diffraction section 311 with diffraction of the second diffraction section 312, and it is possible to improve quality of an image presented to the user.

The structure and advantages of the device of the third embodiment are basically the same as the first embodiment, and so a more detailed description will be omitted.

Fourth Embodiment

Figure 7:
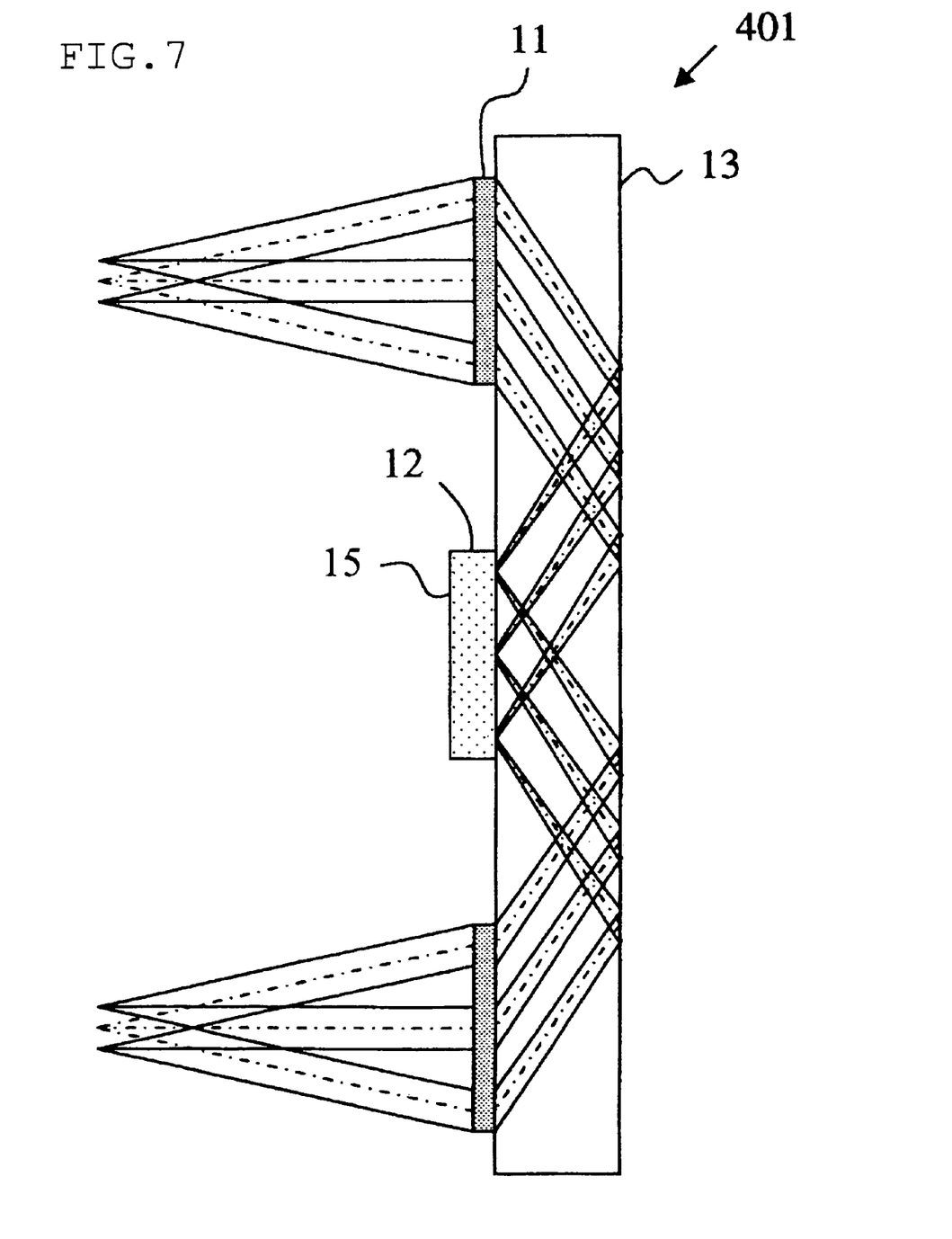
FIG. 7 is an explanatory drawing showing an optical system of a fourth embodiment of the present invention.

Next, an optical system 401 of a fourth embodiment of the present invention will be described based on FIG. 7. In the description of this embodiment, structural elements that are basically common to the optical system 1 of the first embodiment use the same reference numerals to simplify the following description.

With the optical system 1 of the first embodiment, a region 131 where the intermediate image plane is formed (refer to FIG. 1 or FIG. 3) was externally exposed. In contrast, with the device of the fourth embodiment a protective member 15 is arranged at the region 131 where the intermediate image plane is formed, so as to cover this region 131. It is possible to use PMMA or quartz glass, for example, as the material of this protective member 15. It is also possible for the material of the protective member 15 to be the same as that of the light guiding section 13. Further, it is possible for the surface of the protective member 15 and the light guiding section 13 to be adhered, or to have a partial gap between them. Basically, it is sufficient if the protective member 15 is configured to be able to substantially protect the surface of the region 131. In the event that the protective member 15 and light guiding section are adhered, since a total internal reflection condition will be altered at the surface of the light guiding section, it can be expected that it will be necessary to maintain the total internal reflection condition by fitting a reflective film.

According to the device of the fourth embodiment, it is possible to reduce the danger of dust adhering at the region 131 (refer to FIG. 1 or FIG. 3) where the intermediate image plane is formed, and of flaws appearing on the surface of this region 131. Therefore, with this device, degradation of an image formed at the intermediate image plane is prevented, and as a result there is the advantage that it is possible to prevent degradation in an image presented to the user.

The structure and advantages of the device of the fourth embodiment are basically the same as the first embodiment, and so a more detailed description will be omitted.

Fifth Embodiment

Figure 8:
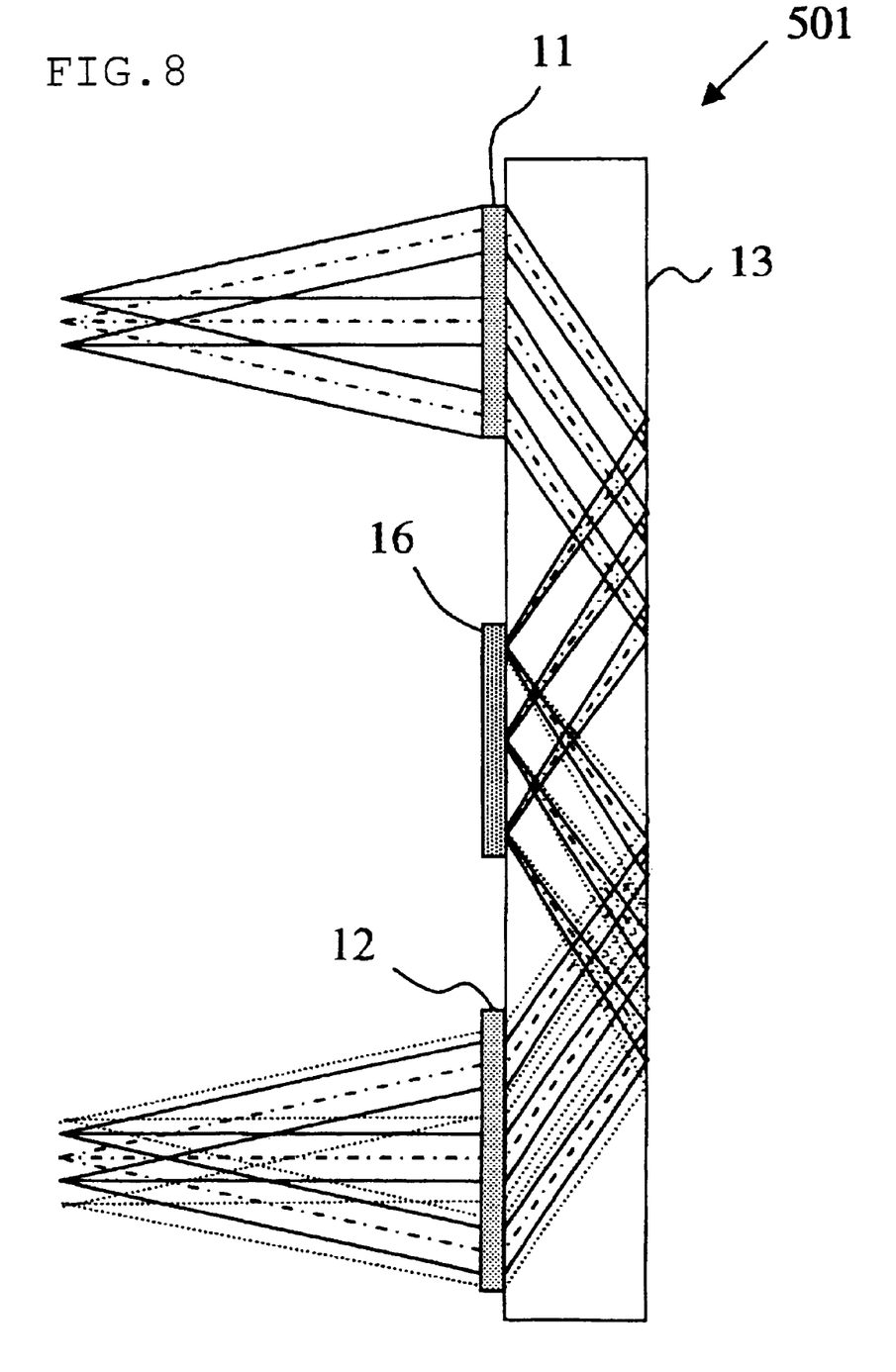
FIG. 8 is an explanatory drawing showing an optical system of a fifth embodiment of the present invention.

Next, an optical system 501 of a fifth embodiment of the present invention will be described based on FIG. 8. In the description of this embodiment, structural elements that are basically common to the optical system 1 of the fourth embodiment use the same reference numerals to simplify the following description.

With the optical system 1 of the fourth embodiment, a protective member 15 was arranged at a region 131 where the intermediate image plane is formed (refer to FIG. 1 and FIG. 3) so as to cover this region 131. Conversely, with the device of the fifth embodiment, instead of the protective member 15 a pupil magnification diffraction section 16 is arranged at a position where the intermediate image plane is formed, so as to contact the surface of the light guiding section 13. By doing this, this embodiment results in a configuration for enlarging the pupil (specifically image) formed by light flux that has been diffracted by this pupil magnification diffraction section 16. Light flux forming the magnified pupil is shown as a dotted line in FIG. 8.

According to the device of the fifth embodiment, since it is possible to enlarge the pupil using the pupil magnification diffraction section 16, it is possible to enlarge an exit pupil heading from the second diffraction section 12 to the retina of the user. There is therefore the advantage that it becomes possible to present an image to the user even if a relative positional relationship between the second. diffraction section 12 and the retina varies slightly.

The structure and advantages of the device of the fifth embodiment are basically the same as the fourth embodiment, and so a more detailed description will be omitted.

The present invention is not limited to the above described embodiments, and various modifications are possible within a scope that does not depart from the spirit of the invention.

For example, with each of the above described embodiments light flux that has been diffracted by the first diffraction section 11 is reflected at least once inside the light guiding section 13 until it reaches the intermediate image plane, but this is not limiting and it is possible to have a structure where it is reflected at least three times, or more.

Also, with each of the above described embodiments light flux that has been diffracted by the first diffraction section 11 is propagated by being reflected inside the light guiding section 13, but it is also possible to propagate by refraction by adjusting refractive index of the inside of the light guiding section 13, for example.

What is claimed is:

1. An optical system comprising a first diffraction section, a second diffraction section, and a light guiding section,
   wherein the first diffraction section and the second diffraction section are attached to the light guiding section in a state separated from each other,
   the first diffraction section diffracts light flux that is incident on the first diffraction section to be incident on the light guiding section,
   the light guiding section guides light flux that has been diffracted by the first diffraction section to the second diffraction section using reflection or refraction inside the light guiding section,
   the second diffraction section re-diffracts light flux that has been guided by the light guiding section and output to outside of the light guiding section, and
   the first diffraction section, the light guiding section, and the second diffraction section are substantially symmetrical on either side of a virtual plane between the first diffraction section and the second diffraction section, and
   wherein the first diffraction section is configured to have an intermediate image plane at substantially a same position as the virtual plane by using the light flux diffracted by the first diffraction section so that the first diffraction section, the light guiding section, and the second diffraction section are substantially symmetrical on either side of the intermediate image plane.

2. The optical system of claim 1, wherein the symmetry is line symmetry on either side of the virtual plane.

3. The optical system of claim 1, further comprising a protective member, and
   wherein the intermediate image plane is formed on a surface of the light guiding section, and
   the protective member is arranged at a position where the intermediate image plane is formed so as to cover the surface of the light guiding section.

4. The optical system of claim 1, further comprising a pupil magnification diffraction section, and
   wherein the intermediate image plane is formed on a surface of the light guiding section, and
   the pupil magnification diffraction section is arranged on the surface of the light guiding section at a position where the intermediate image plane is formed and enlarges an exit pupil constituted by light flux that has been diffracted by the pupil magnification diffraction section.

5. The optical system of claim 1, wherein the first diffraction section is configured to form the intermediate image plane inside or on a surface of the light guiding section, and light flux that has been diffracted by the first diffraction section is reflected at least once inside the light guiding section until reaching the intermediate image plane.

6. The optical system of claim 1, wherein the first diffraction section is configured to form the intermediate image plane inside or on a surface of the light guiding, and light flux that has been diffracted by the first diffraction section is reflected at least three times inside the light guiding section until reaching the intermediate image plane.

7. The optical system of claim 1, wherein the first diffraction section is configured to form the intermediate image plane inside the light guiding section, and wherein the symmetry is rotational symmetry on either side of the virtual plane.

8. The optical system of claim 1, wherein the light guiding section is formed substantially plate shaped, with the first diffraction section arranged on a first surface of the light guiding section, and the second diffraction section arranged on a second surface of the light guiding section.

9. A retinal scanning display comprising the optical system of claim 1, and an image forming device, wherein the image forming device irradiates light flux to the first diffraction section of the optical system and scans the light flux on the first diffraction section, and wherein the second diffraction section has the light flux that has been scanned by the image forming device and has passed through the optical system exiting towards a user's retina, and an image is formed on the retina using light flux that has exited towards the retina.

10. The optical system of claim 3,
    wherein the protective member and the surface of the light guiding section are adhered to each other, and
    wherein a reflective film is disposed on a surface of the protective member facing the light guiding section to maintain a total internal reflection condition for the light flux passing through the light guiding section.

* * * * *